(12) United States Patent
Lutz et al.

(10) Patent No.: US 11,016,472 B2
(45) Date of Patent: May 25, 2021

(54) FIELD DEVICE AND METHOD FOR STARTING UP AN INDUSTRIAL AUTOMATION NETWORK

(71) Applicant: Siemens Aktiengesellschaft, Munich (DE)

(72) Inventors: Benjamin Lutz, Pfinztal (DE); Holger Rachut, Potsdam (DE); Stefan Runde, Leipzig (DE); Gerrit Wolf, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 496 days.

(21) Appl. No.: 15/118,215

(22) PCT Filed: Feb. 12, 2015

(86) PCT No.: PCT/EP2015/052930
§ 371 (c)(1),
(2) Date: Aug. 11, 2016

(87) PCT Pub. No.: WO2015/124485
PCT Pub. Date: Aug. 27, 2015

(65) Prior Publication Data
US 2017/0176982 A1 Jun. 22, 2017

(30) Foreign Application Priority Data
Feb. 21, 2014 (EP) .................................. 14156189

(51) Int. Cl.
G05B 19/418 (2006.01)
G05B 19/042 (2006.01)

(52) U.S. Cl.
CPC ..... G05B 19/4185 (2013.01); G05B 19/0423 (2013.01); G05B 19/0426 (2013.01);
(Continued)

(58) Field of Classification Search
None
See application file for complete search history.

(56) References Cited

U.S. PATENT DOCUMENTS

2003/0163298 A1* 8/2003 Odom .................. G06F 9/4411
703/21
2004/0193287 A1 9/2004 Lefebvre et al.
(Continued)

FOREIGN PATENT DOCUMENTS

CN 101784965 7/2010
CN 103597415 2/2014
(Continued)

OTHER PUBLICATIONS

Office Action dated Feb. 1, 2018 which issued in the corresponding Chinese Patent Application No. 201580006374.7.
(Continued)

*Primary Examiner* — Mohammad Ali
*Assistant Examiner* — Saad M Kabir
(74) *Attorney, Agent, or Firm* — Cozen O'Connor

(57) ABSTRACT

A field device and method for starting up an industrial automation network, wherein to allow virtual start-up of at least one field device, an field device integration package is provided, whose user interface plug-in has an extension that allows a software tool to access a simulation model for the behavior of the at least one field device, and upon virtual start-up, the simulation model is used to reproduce the response of the field device, where a process model or interfacing of an external process model via a co-simulation coupling can also be used to stimulate the reproduced field device behavior, and where because the models with the FDI package are provided by the field device manufacturer, correct simulation and hence minimization of the risks upon start-up of industrial installations can be expected.

4 Claims, 3 Drawing Sheets

(52) U.S. Cl.
CPC ............... *G05B 19/4186* (2013.01); *G05B 2219/23077* (2013.01); *G05B 2219/25428* (2013.01); *G05B 2219/31132* (2013.01); *Y02P 90/02* (2015.11)

(56) References Cited

U.S. PATENT DOCUMENTS

| | | |
|---|---|---|
| 2010/0293539 A1 | 11/2010 | Lefebvre |
| 2013/0006399 A1 | 1/2013 | Tandon et al. |
| 2014/0222408 A1 | 8/2014 | Rathgeb et al. |
| 2015/0113423 A1* | 4/2015 | Giango ............... H04L 67/025 715/740 |

FOREIGN PATENT DOCUMENTS

| | | |
|---|---|---|
| DE | 102 45 176 A1 | 4/2004 |
| WO | WO 2004/042482 A1 | 5/2004 |

OTHER PUBLICATIONS

"FDI—Field Device Integration Technology"; URL:http://www.automation.com/pdf_articles/FDIWhitePaper.pdf; pp. 1-12; XP055179590; 2013; the whole document.

Runde S. et al; "EDDL and semantic web—From field device integration (FDI) to Future Device Management (FDM)"; 2013 IEEE 18th Conference on Emerging Technologies & Factory Automation (ETFA); pp. 1-8; ISSN: 1946-0740; DOI: 10.1109/ETFA.2013.6647962; XP032516963; 2013; abstract; sections 1, 2.2, 2.3, 2.4, 3.2, 3.3.4, 3.3.5 and 5.

* cited by examiner

FIELD DEVICE AND METHOD FOR STARTING UP AN INDUSTRIAL AUTOMATION NETWORK

CROSS-REFERENCE TO RELATED APPLICATIONS

This is a U.S. national stage of application No. PCT/EP2015/052930 filed 12 Feb. 2015. Priority is claimed on European Application No. 14156189.4 filed 21 Feb. 2014, the content of which is incorporated herein by reference in its entirety.

BACKGROUND OF THE INVENTION

1. Field of the Invention

The invention relates to a field device and a method for starting up an industrial automation network with a plurality of field devices that are inter-connected to one another by a network for data communication, where a configuration and parameterization of the field devices located in the automation network is performed by a software tool.

2. Description of the Related Art

Within the context of a life cycle of an industrial installation, the startup phase of the automation technology equipment of the installation assumes particular importance. The time and cost pressure prevailing during startup is immensely high, because there is to be a rapid start to the actual operating phase in which production is running at the installation and the respective installation is producing revenue. In the startup phase, the components of the automation technology equipment pre-selected in the engineering phase and placed in the installation plan, such as stored-program controllers, referred to as controllers, input/output devices, referred to as remote I/Os, measurement transducers, e.g., for throughflow, temperature, fill level or pressure measurement, as well as final controlling elements, e.g., closed-loop control valves and motors, which are referred to in general as field devices in the present application, are put into operation. The field devices are connected by a network for data communication, where field busses, which operate, for example, in accordance with the PROFIBUS, Highway Addressable Remote Transducer (HART) or Fieldbus Foundation (FF) protocols, are frequently used. In the startup phase, the respective functionality of the field device, e.g., the provision of a measured value for a pressure by a pressure transducer, is also put into operation in the respective Supervisory Control and Data Acquisition (SCADA) system, e.g., Windows Control Center (WinCC) or process control system (PLS), e.g., SIMATIC PCS 7. This integration of the respective functionality of field devices in an automation project is achieved with a great deal of manual effort. In addition the real functionality has previously only been validated during the real startup with certain error risks. For example, in process automation in the production of ammonia there is a great danger of explosion or in production automation, because of production errors, for example, the result can be a premature failure before finished automobiles are manufactured in a real startup of an automation technology installation. In order to overcome these dangers, there is an increasing desire for a virtual start up, for which simulation models of the installation processes and the components of the automation technology equipment must be present. Although engineering tools already available, e.g., SIMATIC Process Device Manager (PDM) assist starting up of an automation network, in which field devices are linked to one another for data communication, the problem of starting up the field devices under real process conditions is basically not yet resolved. Although there are actually various approaches to simulating the process and device behavior, these are merely based however on the creation of submodels, which can only reflect segments of the reality. As a rule, users of the engineering tools create models of the quality and precision needed for their respective application, and in addition only cover the functions that are required for their respective simulation.

DE 102 45 176 A1 discloses a method for simulation of a field device in an industrial automation network. Through the simulation, it is to be insured in this network that the function blocks provided for a specific field device can also be loaded into this field device and can execute without problems in the field device. A virtual field device is subdivided into memory management, processor management and a communication interface. Thus the processor power and the memory space of the field device in particular are incorporated into the simulation to guarantee that, when a control strategy is loaded onto the real field device, the respective memory space and the respective processor power of the real device are sufficient to enable the control strategy to be implemented.

For quite some time, Electronic Device Description Language (EDDL) and Field Device Tool/Device Type Manager (FDT/DTM) have been two fundamental methods for integration of field devices. In a Field Device Integration (FDI) concept, which is described in the article entitled "Field Device Integration—Best of both Worlds" by Hans-Georg Kumpfmüller and Roland Lange, published in atp edition, June 2010, pages 16-19, the advantages of the two stated methods are to be combined into one solution. The FDI basic concept defines the components FDI Package, FDI Server and FDI Client. FDI packages are delivered by the device manufacturer and contain all information that is necessary for integration of a device. The device definition comprises management information as well as the device model. Insuring the consistency of this device model as well as the communication logic for the device is done via the business logic. The description of the presentation of the device parameters and device functions is the task of the User Interface Description. These elements of the FDI package are described with EDDL. In addition portions of the operator interface can also be integrated as programmed components, so-called user interface plug-ins (UIPs), of which the basic concept corresponds to the FDT/DTM concept. FDI servers import FDI Device Packages. The device definition and business logic of the FDI Package are executed via an EDD interpreter. The programmed user interface plug-ins are only administered, but not executed, by the server. They are transferred to the clients at the request of the clients. FDI clients realize the interface to the user. Here, the client-server concept allows the distribution of the clients to different computers and also the coordinated and authorized access of a number of clients to the common information model.

SUMMARY OF THE INVENTION

It is an object of the present invention to provide a method for starting up an industrial automation network, with which the outlay for the startup as well as the risk of errors in the subsequent operating phase of an industrial installation is reduced.

This and other objects and advantages are achieved in accordance with the invention by a method for starting up an industrial automation network having the advantage that, because of the provision of a simulation model for the behavior of a field device in an extension of the user interface plug-in of the FDI package for a software tool, which is used for startup of an industrial automation network by a user, access to the simulation model is made possible in an especially simple manner. The simulation model is created by the manufacturer of the field device and is thus (as can be expected because it is created by the manufacturer) of especially high quality and reliability. Through this extension of the user interface plug-in, during the integration of field devices, their virtual startup is also supported. Because of the complexity of current field devices, a virtual startup is a sensible and necessary procedure, before real field devices integrated into an industrial installation come into use in the operating phase during production following on from startup. Often, several hundred parameters must be set at field devices before the field devices operate correctly in the sense of the respective automation solution. In order to minimize incorrect parameterization and its consequences, it is therefore of great advantage for field devices to be started up virtually based on a correct simulation model provided by the manufacturer, where the simulation model is advantageously provided in the respective FDI package of the field device as an extension of the user interface plug-in.

A further advantage is the platform independence of a simulation model realized as an extension of a user interface plug-in. The Microsoft .net technology is namely used for the realization of the user interface plug-in. This technology is present on all current PC-based Windows versions. It uses an intermediate language, so that a .net component, once created and translated into the intermediate language, is capable of running on all Windows versions. The abstraction to the operating system is undertaken via the .net runtime environment, which accesses the simulation model. In addition, in an advantageous manner, FDI specifies the use of variants of the user interface plug-in. The different variants can in such cases differ both in the operating system supported and also in the client environment supported. Consequently, there can be one variant for use by a software tool on a Personal Computer (PC), another for use in a software tool running on a handheld device. A number of variants of a user interface plug-in can be delivered in one FDI package. As the FDI client, the software tool only accesses the variant of the simulation model that is best suited to its execution environment. For possible modifications of simulation models by the software tool, the consistency of the respective simulation model is also insured in an advantageous manner by the business logic available in the FDI server. If only certified FDI packages and thus certified simulation models are allowed, the quality of the simulation during the startup can be further improved.

In accordance with the invention, the extension of the user interface plug-in is formed such that, for a software tool that is employed to start up the automation network, as well as the simulation model for the behavior of a field device, additional access is made possible to a simulation model for a process or a sub-process. The stimulation for the simulated behavior of the field device able to be obtained thereby contributes in an advantageous manner to a simulation of the industrial installation that is closer to reality.

In such cases, the simulation model can contain stimulation patterns prefabricated for the process, which are each present as an extension in the respective user interface plug-in itself. From these, a pattern matching the respective application can be selected in an advantageous manner, such as a sinusoidal or ramp-shaped curve of a pressure for a pressure transducer as field device.

As an alternative or in addition to the stimulation patterns, access can also be made possible to a simulation model for the process or for a sub-process by a co-simulation coupling, through which a process model that is not stored or unstored in the user interface plug-in is linked to the model for the field device behavior. In an advantageous manner, this also enables more comprehensive process models for stimulation to be used for the simulated field device behavior. For example, there are already comprehensive simulation models available for processes for the simulation tool SIMIT of Siemens AG, which is used for virtually starting industrial installations, which can markedly expand the simulation options.

Especially advantageous is an embodiment of the invention in which the FDI package expanded by simulation models is already part of the scope of delivery of the manufacturer of field devices. In this case, it is preferably stored for electronic readout in a memory of the field device and/or is delivered in a file transported separately, e.g., by authorized downloading from a server at the manufacturer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, as well as its embodiments and advantages, is explained in greater detail below with reference to the drawings, in which exemplary embodiments of the invention are presented, and in which.

DETAILED DESCRIPTION OF THE EXEMPLARY EMBODIMENTS

Figure 1:
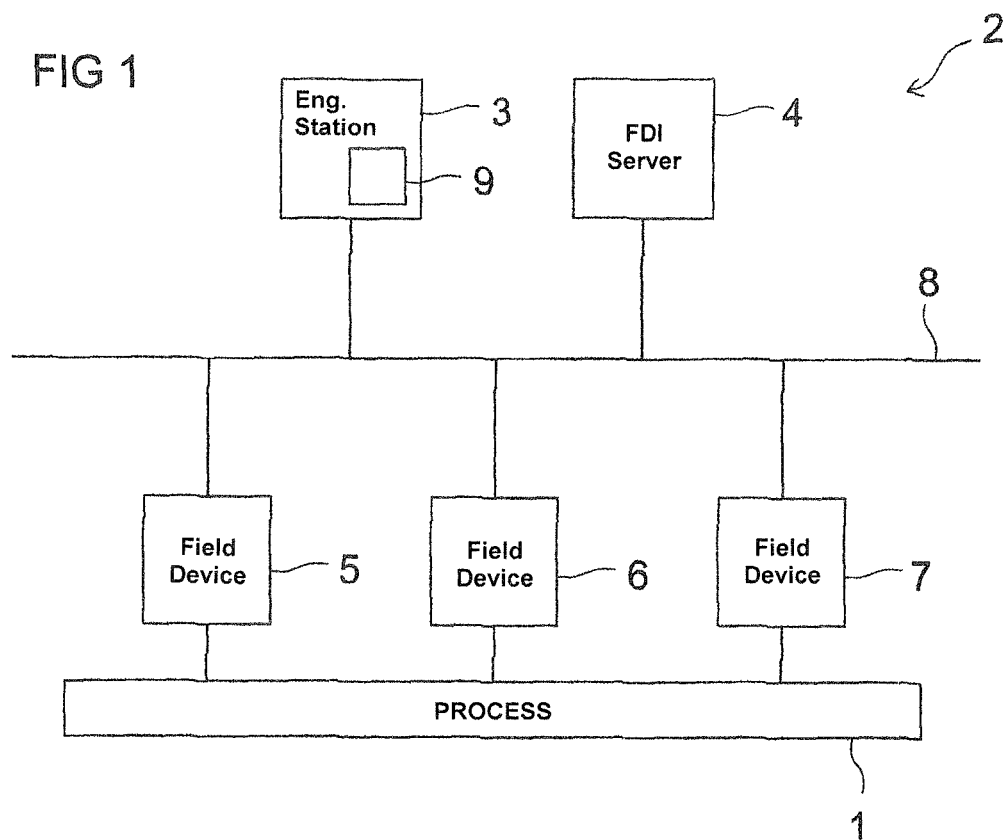
FIG. 1 shows a block diagram of an industrial installation in accordance with the invention.

FIG. 1 shows an automation technology installation in which a process 1 is controlled by an automation network 2. In the automation network 2 are an engineering station 3, an FDI server 4 and field devices 5, 6 and 7, which are connected to each other for data communication by an Ethernet-based communication network 8. The FDI concept is bus-neutral. As a result, the data communication network 8 can involve any given network, e.g., with a PROFIBUS, PROFINET, HART or FF protocol. The field devices 5, 6 and 7 are process-related components, such as a stored-program controller, which is frequently just referred to as a controller, a measurement transducer for detecting a physical variable in the process 1 to be automated, e.g., a pressure, or an adjustment element for influencing the process 1 as a function of the detected physical variable, e.g., a closed-loop control valve. A configuration and parameterization of the field devices located in the automation network is performed by the software tool 9 during the startup. FDI packages, the information content of which a software tool 9 that runs on an engineering station 3 can access as FDI client, are stored on the FDI server 4 in each case for the field devices 5, 6 and 7. Stored in the FDI packages, as will be explained in greater detail below, are models for the behavior of the field devices 5, 6 and 7 and also models for part aspects of the process, accessible for the software tool 9. In order to keep the risk of any errors that might occur in the operating phase of the process technology installation as low as possible, a simulation is performed based on these models by the software tool 9 in a startup phase preceding the operating phase. The installation is thus started up virtually and without a real process 1 running.

For improved clarity, FIG. 1 shows the software tool 9 drawn in as a block on an engineering station 3. This is not to be understood as the software tool 9 only being able to be run on one processing unit. Naturally, the software tool 9 can be subdivided in one realization into different sub-tasks, which can then run on different processing units, also called stations.

Figure 2:
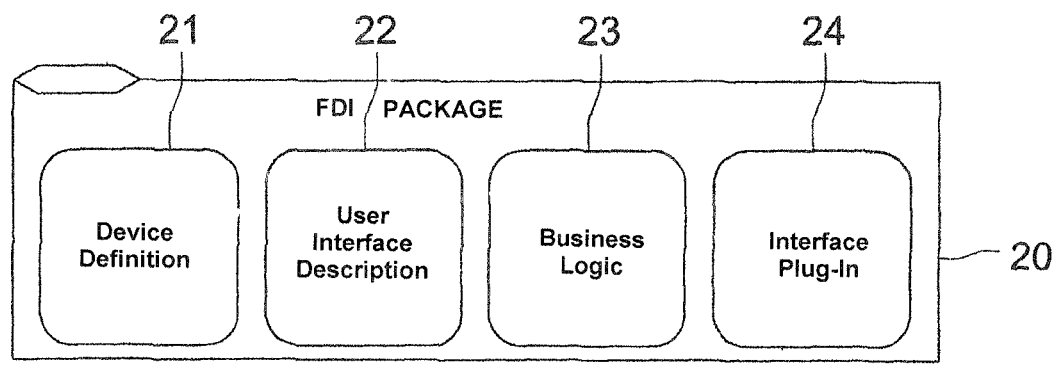
FIG. 2 shows a structure of an FDI package in accordance with the invention.

In a known way, an FDI package 20 in accordance with FIG. 2 contains a Device Definition 21, a User Interface Description 22 and a Business Logic 23, which correspond to the FDI concept. Stored in the user interface plug-in 24 is a simulation model created by the manufacturer of the respective field device for the behavior of the field device. The model cannot be changed by the user and should thus be correct. In addition, different models for process simulation, through which a stimulation for the behavior model of the field device can be created, are provided in the user interface plug-in 24.

Figure 3:
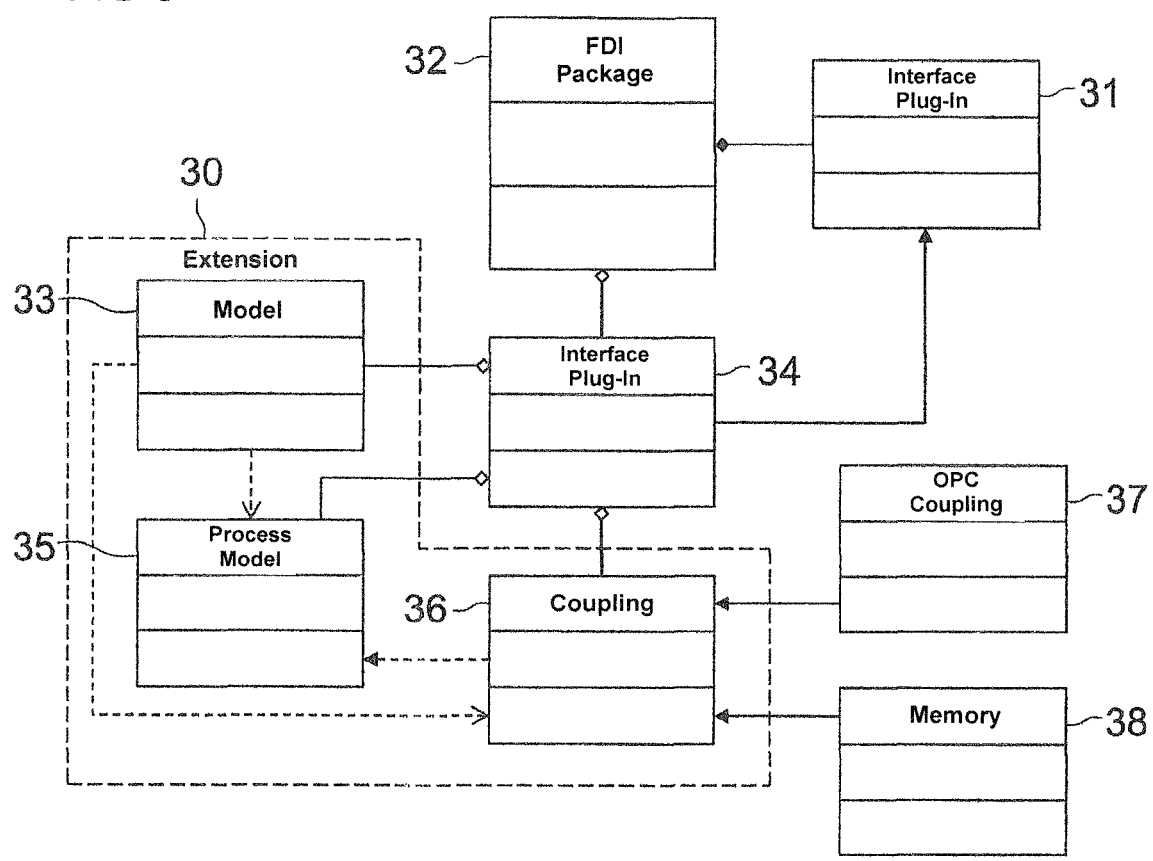
FIG. 3 shows a UML (Unified Modeling Language) class diagram of an FDI package.

FIG. 3 shows a UML class diagram to illustrate an extension 30 of a conventional user interface plug-in 31, which forms an element of a conventional FDI package 32. A user interface plug-in 34 expanded by a field device behavior model 33 here inherits all significant characteristics and methods of the conventional user interface plug-in 31 because, in the exemplary embodiment shown, the operator interface of the field device is to possess the same appearance during a virtual startup as it does during a conventional startup. The model 33, which is stored in the user interface plug-in 34 of the FDI package 32, serves to simulate the field device behavior during the startup of an automation network. To create a stimulation in the simulation of the field device behavior, on the one hand, there is a simulatable process model 35 available, which is likewise provided in the extension 30 of the user interface plug-in 34 and, on the other hand, there is a co-simulation coupling 36, which makes it possible to link in the external process model or an external simulator. The co-simulation coupling 36 can link in an external simulator for a process simulation via an OPC coupling 37 or via a shared memory 38. This makes it possible to incorporate further and, under some circumstances, very comprehensive process models into the simulation. On the side of the field device behavior model 33, the process model 35 and the co-simulation coupling 36 possess the same interface.

The advantages that are obtained by the invention are briefly re-summarized advance testing under real conditions of the automation technology components installed, called field devices here, is possible, minimization of critical states in the real startup of an industrial installation, models for simulation of the device behavior come from the manufacturer and should thus be correct, process models are able to be coupled to PLS and SCADA functions, no change of the PLS or SCADA is necessary, therefore simple implementation in existing engineering systems, and consistent use of field device models in startup.

Figure 4:
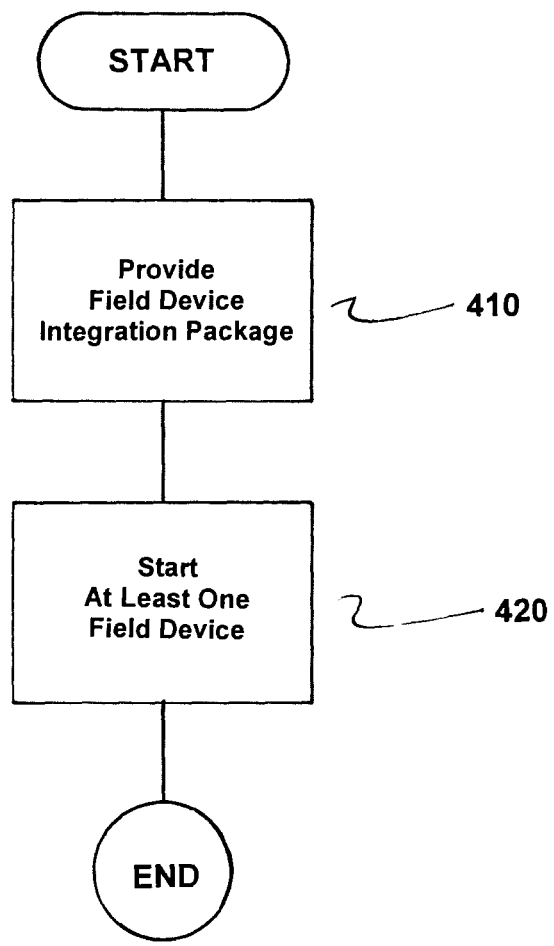
FIG. 4 is a flowchart of the method in accordance with the invention.

FIG. 4 is a flowchart of a method for starting an industrial automation network (2) with a plurality of field devices (5, 6, 7) which are interconnected to one another by a network (8) for data communication, where a configuration and parameterization of the plurality of field devices (5, 6, 7) located in the automation network (2) is performed by a software tool (9). The method comprises providing a field device integration (FDI) package (20, 32) including a user interface plug-in (24, 34) having an extension (30) via though which access to a simulation model (33) for behavior of at least one field device (5, 6, 7) occurs for the software tool (9), as indicated in step 410. Next, the at least one field device (5, 6, 7) is started virtually via the software tool (9), with the behavior of the at least one field device (5, 6, 7) being simulated via the simulation model (33) as indicated in step 420.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for starting an industrial automation network with a plurality of field devices which are interconnected to one another by a network for data communication, wherein a configuration and parameterization of the plurality of field devices located in the automation network is performed by a software tool, the method comprising:

providing a field device integration package including a user interface plug-in having an extension comprising a simulation model provided in the extension via which access to the simulation model for behavior of at least one field device occurs for the software tool and the software tool is additionally provided with access to the simulation model for a process by the extension of the user interface plug-in;

starting the at least one field device virtually via the software tool, the behavior of the at least one field device being simulated via the simulation model during a startup phase of the industrial automation network preceding an operating phase of the industrial automation network to reduce errors during operation of the industrial automation network; and bringing the at least one field device into use in the operating phase of the industrial automation network.

2. The method as claimed in claim 1, wherein the simulation model for the process contains prefabricated stimulation patterns and is stored in the user interface plug-in.

3. The method as claimed in claim 1, wherein access to the simulation model for the process occurs via a co-simulation coupling, through which a process model that is not stored in the user interface plug-in, is linked to the model for the field device behavior.

4. The method as claimed in claim 2, wherein access to the simulation model for the process occurs via a co-simulation coupling, through which a process model that is not stored in the user interface plug-in, is linked to the model for the field device behavior.

\* \* \* \* \*